United States Patent
Weir et al.

(10) Patent No.: US 9,091,557 B2
(45) Date of Patent: Jul. 28, 2015

(54) NAVIGATION SYSTEM FOR PROVIDING PERSONALIZED DIRECTIONS

(71) Applicant: TOYOTA JIDOSHA KABUSHIKI KAISHA, Toyota-shi, Aichi-ken (JP)

(72) Inventors: David Frank Russell Weir, San Jose, CA (US); Vinuth Rai, Mountain View, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 88 days.

(21) Appl. No.: 14/049,157

(22) Filed: Oct. 8, 2013

(65) Prior Publication Data

US 2015/0100231 A1    Apr. 9, 2015

(51) Int. Cl.
G01C 21/34     (2006.01)
G01C 21/36     (2006.01)
G08G 1/0968    (2006.01)

(52) U.S. Cl.
CPC ............ *G01C 21/34* (2013.01); *G01C 21/3641* (2013.01); *G08G 1/096822* (2013.01); *G08G 1/096861* (2013.01); *G08G 1/096872* (2013.01)

(58) Field of Classification Search
None
See application file for complete search history.

(56) References Cited

U.S. PATENT DOCUMENTS

| | | | |
|---|---|---|---|
| 5,471,393 A * | 11/1995 | Bolger | 701/446 |
| 5,528,501 A | 6/1996 | Hanson | |
| 6,983,204 B2 * | 1/2006 | Knutson | 701/414 |
| 7,680,749 B1 | 3/2010 | Golding et al. | |
| 8,340,898 B2 * | 12/2012 | Currie et al. | 701/409 |
| 2001/0004725 A1 * | 6/2001 | Yagyu | 701/210 |
| 2014/0039789 A1 * | 2/2014 | Bell et al. | 701/428 |
| 2014/0107816 A1 * | 4/2014 | Guedalia et al. | 700/91 |

FOREIGN PATENT DOCUMENTS

| | | |
|---|---|---|
| EP | 2466260 | 6/2012 |
| EP | 2530435 | 12/2012 |

OTHER PUBLICATIONS

International Search Report and Written Opinion for PCT/JP2014/002703, mailed Sep. 4, 2014 (11 pages).

* cited by examiner

*Primary Examiner* — Calvin Cheung
(74) *Attorney, Agent, or Firm* — Patent Law Works LLP

(57) ABSTRACT

The disclosure includes a system and method for providing personalized recommendations. The system includes a navigation application comprising a route engine, an intersection extractor, a historical analyzer and a user interface module. The processing unit receives data and transmits the data to the corresponding component in the navigation application. The route engine determines a new route from a first location to a second location for a user, the new route comprising directions for each portion of the new route. The intersection extractor identifies intersections that occur on the new route. The historical analyzer determines historical routes traveled by the user, compares the new route to the historical route to identify which portions and intersections in the new route are familiar to the user and removes directions for the portions of the new route that are familiar. The user interface module provides the new route to the user.

20 Claims, 8 Drawing Sheets

325

```
Navigation Settings                    Heuristics
Emphasize intersections
                                       ○ Freeway
├────●────┤                            ├────●────────┤
No   Some  Yes                         Not           Very
Remove directions for familiar areas   important     important
                                       ○ City streets
├────●────┤                            ├●────────────┤
No   Some  Yes                         Not           Very
                                       important     important
```

Feedback

At the intersection of 1$^{st}$ Rd. and A St. I think you said "Where do I turn?" In the future do you want more directions for intersections?

☑ Yes        ○ No        ○ Have a representative contact me.

Ten minutes after driving on Rt. 95, after I said to stay on Rt. 95 you said "I know." In the future do you want fewer directions about staying on the same road?

○ Yes        ☑ No        ○ Have a representative contact me.

Figure 3C

NAVIGATION SYSTEM FOR PROVIDING PERSONALIZED DIRECTIONS

BACKGROUND

1. Technical Field

The specification relates to a navigation system for providing personalized directions. In particular, the specification relates to a navigation system for filtering directions based on a classification of portions of the route and the user's familiarity with portions of the route.

2. Description of the Background Art

Users are increasingly relying on navigational systems in computing devices to help guide them to destinations. These navigation systems suffer from two problems: (1) they provide too much information; and (2) they lack sufficient information. Navigational systems provide too much information, for example, when the user is familiar with the route. In another example, navigational systems can provide guidance that is unnecessary for the user, such as instructing the user to stay on a current route instead of informing the user when to turn off the route. Navigational systems provide insufficient guidance when, for example, they fail to put enough emphasis on certain directions where the user is unfamiliar with the area or the user fails to notice key directions because the user is overwhelmed with other directions provided by the navigation system.

SUMMARY

The system overcomes the deficiencies of the prior art with systems and methods for providing personalized directions. In one embodiment, the system includes a navigation application comprising a processing unit, a route engine, an intersection extractor, a historical analyzer and a user interface module. The processing unit receives data and transmits the data to the corresponding component in the navigation application. The route engine determines a new route from a first location to a second location for a user, the new route comprising directions for each portion of the new route. The intersection extractor identifies intersections that occur on the new route. The historical analyzer determines historical routes traveled by the user, compares the new route to the historical route to identify which portions and intersections in the new route are familiar to the user and removes directions for the portions of the new route that are familiar. The user interface module provides the new route to the user.

In some embodiments, the navigation application also comprises a classifier for classifying each portion of the route and each intersection according to heuristics, wherein a highest classification corresponds to an important portion or intersection in the new route. The classifier then filters the portions and the intersections based on a threshold.

In some other embodiments, the navigation application also comprises a feedback analyzer for recording the user's audio after a new route is provided, converts the audio to text, identifies the text that represents feedback and modifies at least one setting based on the feedback.

The system is particularly advantageous in numerous respects. First, the system provides personalized guidance that helps users reach their destinations more efficiently. Second, the system can promote safety because the user can listen to directions instead of having to stare at a display of the map to confirm the directions because the directions are confusing. It should be understood that the forgoing advantages are provided by way of example and the system may have numerous other advantages and benefits.

BRIEF DESCRIPTION OF THE DRAWINGS

The invention is illustrated by way of example, and not by way of limitation in the figures of the accompanying drawings in which like reference numerals are used to refer to similar elements.

FIG. 3B is a graphic representation illustrating one embodiment of an example user interface for modifying navigation settings and heuristics.

FIG. 3C is a graphic representation illustrating one embodiment of an example user interface for providing feedback.

DETAILED DESCRIPTION

Figure 1:
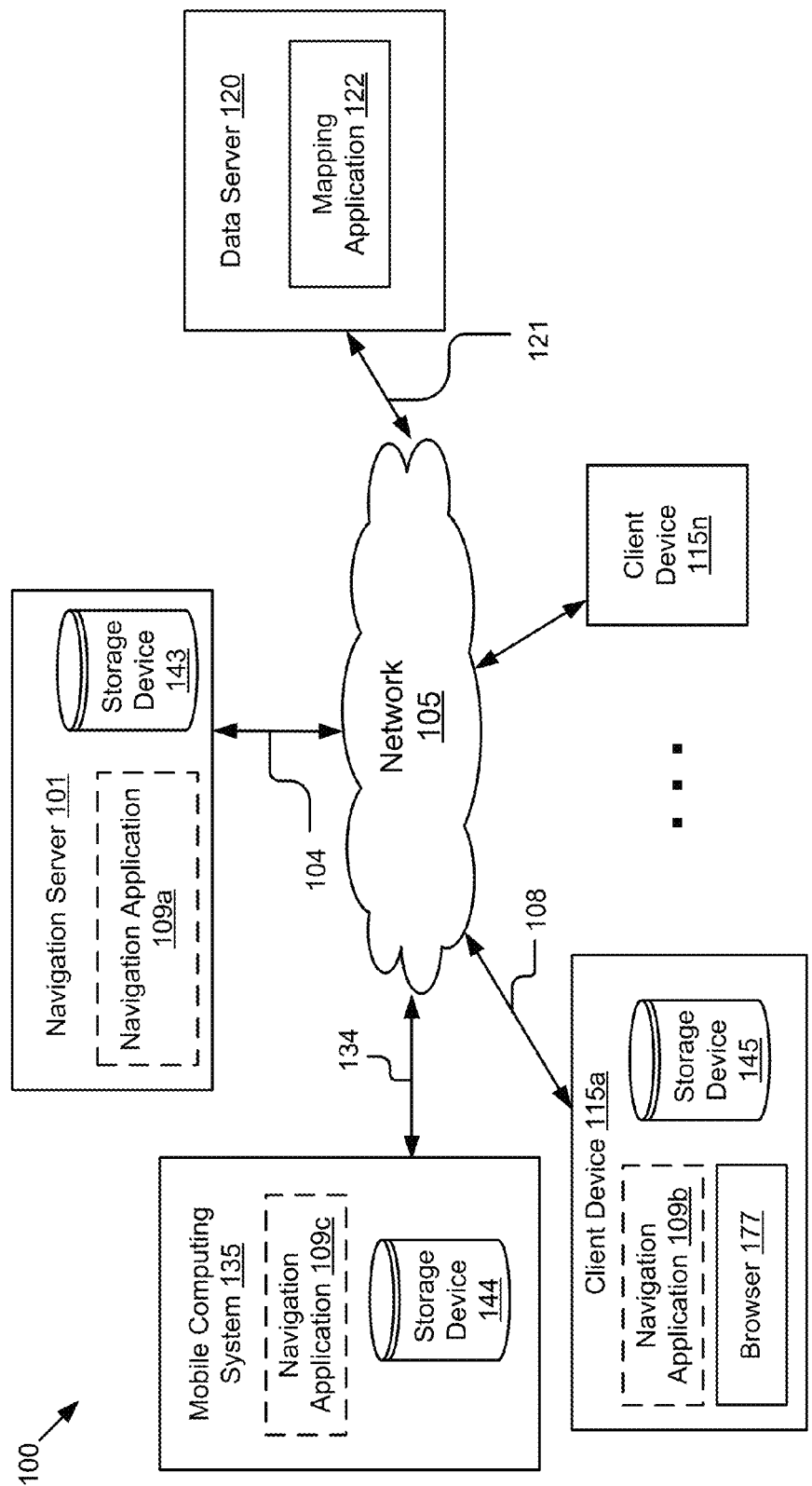
FIG. 1 is a high-level block diagram illustrating one embodiment of a system for providing personalized directions.

Technology for providing personalized directions is described below. In the following description, for purposes of explanation, numerous specific details are set forth in order to provide a thorough understanding of the technology. It will be apparent, however, to one skilled in the art that the embodiments can be practiced without these specific details. In other instances, structures and devices are shown in block diagram form in order to avoid obscuring the technology. For example, the technology is described in one embodiment below with reference to client devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The technology also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. An example embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this technology, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for providing personalized directions. The illustrated system 100 includes a navigation server 101, a client device 115, a mobile computing system 135 and a data server 120 that are communicatively coupled via a network 105. In FIG. 1 and the remaining figures, a letter after a reference number, e.g., "115a," represents a reference to the element having that particular reference number. A reference number in the text without a following letter, e.g., "115," represents a general reference to instances of the element bearing that reference number.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the, navigation server 101, the client device 115, the mobile computing system 135 and the data server 120, in practice one or more networks 105 can be connected to these entities.

In one embodiment, the navigation application 109a is operable on the navigation server 101, which is coupled to the network via signal line 104. The navigation server 101 can be a hardware and/or virtual server, which may include a processor, a memory and network communication capabilities. In some embodiments, the navigation server 101 sends and receives data to and from one or more of the data server 120, the client devices 115a . . . 115n and the mobile computing system 135. The navigation server 101 also includes a storage device 143, which includes registration data for users, routes (e.g. new routes and historical routes), intersections, classification data, feedback, settings for each user, etc.

In another embodiment, the navigation application 109b is operable on a client device 115a, which is connected to the network via signal line 108. In some embodiments, the client device 115 sends and receives data to and from one or more of the navigation server 101, the data server 120 and the mobile computing system 135. The client device 115 may be a computing device that includes a memory and a processor, for example a laptop computer, a desktop computer, a tablet computer, a mobile telephone, a personal digital assistant (PDA) or a mobile email device. In some embodiments, the client device 115a includes a browser 177 for accessing online services and a storage device 145 for storing registration data for a user, routes (e.g. new routes and historical routes), intersections, classification data, feedback, user settings, etc. In one embodiment, the navigation application 109b anticipates routes that the user might use, pre-fetches the routes and stores the routes in the storage device 145.

In some instances, the navigation application 109b acts as a thin-client application that may be stored in part on the client device 115 and in part as components that may be stored on the navigation server 101. For example, the navigation server 101 may store the user data in the storage device 143 and generate new route for the user. The navigation application 103b may send the new routes to the navigation application 109b on the client device 115a, which may use the browser 177 to display the new routes.

In some embodiments, the navigation application 109c is operable on a mobile computing system 135, which is coupled to the network 105 via signal line 134 in FIG. 1. In some embodiments, the mobile computing system 135 sends and receives data to and from one or more of the navigation server 101, the data server 120 and the client devices 115. The mobile computing system 135 is any computing device that includes a memory and a processor. In one embodiment, the mobile computing system 135 is one of a vehicle, an automobile, a bus, a bionic implant or any other mobile system with non-transitory computer electronics (e.g., a processor, a memory or any combination of non-transitory computer electronics). In some embodiments, the mobile computing system 135 includes a storage device 144 for storing registration data for a user, routes (e.g. new routes and historical routes), intersections, classification data, feedback, user settings, etc. In one embodiment, the navigation application 109c anticipates routes that the user might use, pre-fetches the routes and stores the routes in the storage device 144.

The navigation application 109 is code and routines for providing personalized directions. In one embodiment, the navigation application 109 may determine a new route, identify intersections that occur on the new route, determine historical routes traveled by the user, compare the new route to the historical route to identify which portions and intersections in the new route are familiar to the user, remove directions for the portions of the new route that are familiar and provide the new route to the user.

As depicted, the data server 120 includes a mapping application 122 and is connected to the network 105 via signal line 121. In some embodiments, the mapping application 122 may receive a request for a map from the navigation application 109. For example, the navigation application 109 may request directions from a first location to a second location. In some embodiments, the navigation application 109 may also specify whether the directions prioritize highway driving, a fastest route, a shortest route, etc. In further embodiments, the mapping application 122 may generate additional or different information relating to navigation, for example, real-time traffic updates, construction updates and rating information for landmarks (e.g. restaurants, hotels, etc.).

Example Navigation Application

Figure 2:
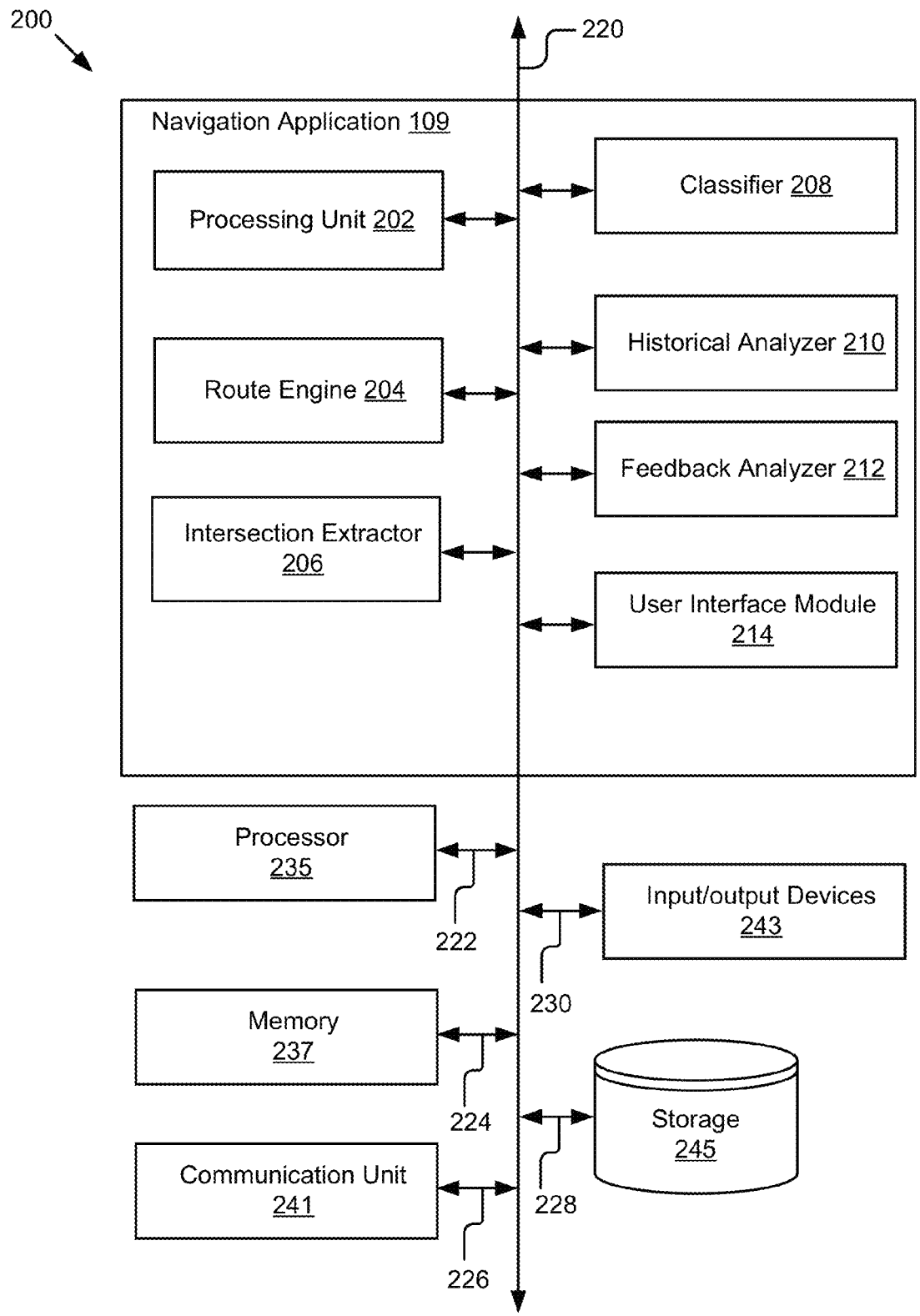
FIG. 2 is a block diagram illustrating one embodiment of a navigation application.

Referring now to FIG. 2, an example of the navigation application 109 is shown in more detail. FIG. 2 is a block diagram of a computing device 200 that includes a navigation application 109, a processor 235, a memory 237, a communication unit 241, an input output device 243 and a storage device 245 according to some embodiments. The components of the computing device 200 are communicatively coupled by a bus 220. In one embodiment, the computing device 200 is a navigation server 101. In another embodiment, the computing device 200 is a client device 115. In yet another embodiment, the computing device 200 is a mobile computing system 135.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 may transmit and receives data to and from the navigation application 109. The communication unit 241 is coupled to the bus 220 via signal line 226. In some embodiments, the communication unit 241 includes a wireless transceiver for exchanging data with the other components in the system 100 or other communication channels using one or more wireless communication methods, including IEEE 802.11, IEEE 802.16, BLUETOOTH® or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The input/output devices 243 are hardware for receiving input and/or providing output. For example, the input/output devices 243 may include speakers to produce sound (e.g., audio instructions corresponding to the route), microphones to record sound (e.g., feedback from the user) and other sensors or feedback devices like accelerometers. Optionally, the input/output devices 243 may include one or more analog-to-digital or digital-to-analog converters, and/or one or more digital signal processors to facilitate audio processing. These input/output devices 243 are coupled to the bus 220 for communication with the processor 235 and the memory 237. Optionally, a microcontroller may be added as part of the input/output devices 243 to facilitate power systems control, as well as off-load the main processor 235 from lower-speed lesser-important tasks.

The storage device 245 can be a non-transitory memory that stores data for providing the functionality described herein. In one embodiment, the storage device 245 is the storage device 143 that is part of the navigation server 101. In another embodiment, the storage device 245 is the storage device 144 that is part of the mobile computing system 135. In yet another embodiment, the storage device 245 is the storage device 144 that is part of the mobile computing system 135.

The storage device 245 may be a dynamic random access memory (DRAM) device, a static random access memory (SRAM) device, flash memory or some other memory devices. In some embodiments, the storage device 245 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 245 is communicatively coupled to the bus 220 via signal line 228. In one embodiment, the storage device 245 includes user registration data. For example, a full name, username, password, billing address, settings, etc. The storage device 245 can also include routes (e.g. new routes and historical routes), maps, roads, points of interest, intersections, classification data, feedback, settings for each user, etc. In some embodiments, the storage device 245 may store other data for providing the functionality described herein.

In the illustrated embodiment shown in FIG. 2, the tracking application 109 includes a processing unit 202, a route engine, an intersection extractor 206, a classifier 208, a historical analyzer 210, a feedback analyzer 212 and a user interface module 214. The components of the tracking application 109 are communicatively coupled via the bus 220.

The processing unit 202 can be software including routines for handling communications between the navigation application 109 and other components of the computing device 200. In one embodiment, the processing unit 202 can be a set of instructions executable by the processor 235 to provide the functionality described below for handling communications between the navigation application 109 and other components of the computing device 200. In another embodiment, the processing unit 202 can be stored in the memory 237 of the computing device 200 and can be accessible and executable by the processor 235. In either embodiment, the processing unit 202 can be adapted for cooperation and communication with the processor 235 and other components of the computing device 200.

In one embodiment, the processing unit 202 may receive a request for a route from the mobile computing system 135 or a mobile computing system 135. The processing unit 202 may transmit the request to the route engine 204. Once the route is generated and the user interface module 214 may generate graphical data for displaying the route, the processing unit 202 may transmit the route to the requestor via the communication unit 241. In another embodiment, the processing unit 202 may receive a route or additional information, such as construction updates from the mapping application 122 on the data server 120. The processing unit 202 may transmit the information to the route engine 204.

The route engine 204 can be software including routines for determining a route or requesting a route from the mapping application 122. In one embodiment, the route engine 204 can be a set of instructions executable by the processor 235 to provide the functionality described below for determining a route. In another embodiment, the route engine 204 can be stored in the memory 237 of the computing device 200 and can be accessible and executable by the processor 235. In either embodiment, the route engine 204 can be adapted for cooperation and communication with the processor 235 and other components of the computing device 200.

In one embodiment, the route engine 204 may receive a request for a route from the user's current location to an end destination. For example, the route engine 204 may receive information about the user's current position from a satellite, a triangulation system, etc. In another embodiment, the request includes a beginning point and the end point. For example, the user requests directions from point A to point B. The route engine 204 either may generate the route directly, or may transmit a request to a mapping application 122 to generate the route. Where the route engine 204 generates its own route, the route engine 204 can identify roads from the beginning point to the end point and select the best roads for the route. For example, the route engine 204 may determine the user's current location, determine the distance of each road, the speed limit on each road, the number of turns required for each potential route, etc. and generate a route that minimizes the travel time. For example, the route engine 204 may determine how long it takes to traverse one route over another route depending on the speed limits and the average time associated with each light. For instance, the route engine 204 can instruct a user to take a left hand turn onto Street A instead of a right-hand turn, if the right-hand turn would require the user to cross four lanes of traffic.

In another embodiment, the route engine 204 may generate a new route based on historical routes. For example, the route engine 204 can determine from the user's past data that at 8:30 a.m. Monday through Friday, the user drives from home to work. As a result, the route engine 204 can generate a route from home to work for the user at 8:30 a.m. Monday through Friday.

In one embodiment, the route engine 204 may receive additional information from the mapping application 122 that the route engine 204 can use to modify or enhance the route. For example, the mapping application 122 may transmit information about traffic conditions, such as construction, accidents or heavy traffic to the route engine 204 that the route engine 204 can use to generate an alternate route. For example, if one street is undergoing construction, the route engine 204 may determine a nearby parallel street and modify the route to include the parallel street.

In one embodiment, the route engine 204 may determine the route based on a user preference or default settings. For example, the default setting for the route engine 204 may be to determine the fastest route. The user can modify the default setting after receiving a user interface from the user interface module 214. For example, the user can modify the setting to a preference for the least use of highways, the most use of highways, the shortest route, the longest route, etc. In another embodiment, the route engine 204 can also determine the route based on the user specifying whether the user will be walking, driving, taking public transit or bicycling.

In one embodiment, the route engine 204 can track the user's location as the user travels the route. If the user deviates a threshold amount from the route provided to the user, the route engine 204 can generate a new route. The route engine 204 may instruct the user interface module 214 to update the user interface to reflect the user's current position. The route engine 204 may save the user's movements as a historical route in storage 245.

The intersection extractor 206 can be software including routines for extracting intersections from the route generated by the route engine 204. In one embodiment, the intersection extractor 206 can be a set of instructions executable by the processor 235 to provide the functionality described below for extracting intersections. In another embodiment, the intersection extractor 206 can be stored in the memory 237 of the computing device 200 and can be accessible and executable by the processor 235. In either embodiment, the intersection extractor 206 can be adapted for cooperation and communication with the processor 235 and other components of the computing device 200.

The intersection extractor 206 may receive the route from the route engine 204. The route may include a series of directions. For example: "Head west for 0.2 miles on St. A, turn right on St. B, drive for 1.0 miles, turn left on St. C." The intersection extractor 206 may identify the intersection between St. A and St. B and the intersection between St. B and St. C. The intersection extractor 206 may transmit the intersections directly to the classifier 208 or may transmit them to the storage 245.

The classifier 208 can be software including routines for classifying roads and intersections. In one embodiment, the classifier 208 can be a set of instructions executable by the processor 235 to provide the functionality described below for classifying roads and intersections. In another embodiment, the classifier 208 can be stored in the memory 237 of the computing device 200 and can be accessible and executable by the processor 235. In either embodiment, classifier 208 can be adapted for cooperation and communication with the processor 235 and other components of the computing device 200.

The classifier 208 may receive the route from the route engine 204 and the intersections for the route from the intersection extractor 206. The classifier 208 may assign a classification to each road and intersection. These roads and intersections are also referred to as portions of the route. In one embodiment, the classifier 208 may assign a classifier score on a scale from 1 to 100, where 1 is least important and 100 is most important. However, it should be understood that other scales and methods of assigning the classifier score are possible, for example, where the scale is out of 10, where the lowest number indicates the most important classification, etc.

The classifier 208 may assign the classifier to each road and intersection based on the significance of the road or intersection. The significance of the road or intersection may be based on the size of the road. For example, the classifier 208 may assign more importance (e.g. a higher classification score) to a freeway than a city street. In another example, the classifier may assign more importance (e.g. a higher classification score) to an intersection that is an on-ramp to the freeway than the intersection of two city streets. In another embodiment, the classifier 208 may assign a classification score to the portion of the route based on its relationship to the rest of the route. For example, where the intersection is with a road that the user travels for 50% of the trip, the classifier 208 may assign more importance to the intersection than if the intersection is with a road that is used for less than 50% of the trip. In another example, the classifier 208 may assign more importance to a street if it makes up 25% of the route than if it is only 10% of the route. In some embodiments, the user can specify a ranking for the different heuristics, or the classifier 208 may use default values. For example, the classifier 208 may assign more importance to the percentage of the portion of the route according to a threshold value (e.g. greater than 10% of the route) than the size of the road or intersection. As a result, the classifier 208 could assign a four-lane highway a more important classifier score than an intersection to turn onto a city street that is 11% of the route, depending on how the heuristics are ordered.

In one embodiment, the classifier 208 may filter the portions of the route based on classification scores for each portion of the route. For example, the classifier 208 may use a threshold value and if the classification score for a portion of the route exceeds the threshold value (or is below it depending upon the scoring scheme), the classifier 208 removes the portion from the route. The filtered route is advantageous because it helps the user focus on the significant directions and avoids giving the user extraneous information.

The historical analyzer 210 can be software including routines for removing portions of the route that are familiar to the user. In one embodiment, the historical analyzer 210 can be a set of instructions executable by the processor 235 to provide the functionality described below for removing familiar portions of the route. In another embodiment, the historical analyzer 210 can be stored in the memory 237 of the computing device 200 and can be accessible and executable by the processor 235. In either embodiment, the historical analyzer 210 can be adapted for cooperation and communication with the processor 235 and other components of the computing device 200.

In one embodiment, the historical analyzer 210 may retrieve historical routes that the user has already traveled from storage 245. For example, the route engine 204 may track the user's movement and records it as a historical route. This movement could be limited to the user's previous usage of the navigation application 109 or, subject to the user's permission, more general tracking using location tracking equipment such as a global positioning system. The historical analyzer 210 may identify which portions in the route the user travels and associate a count with each intersection or route. For example, the user has driven on First Street 5,899 times because he lives on this street. For intersections, in some embodiments, the historical analyzer 210 counts an intersection independent of the user's location. For example, at the intersection of Broadway and Magnolia Lane, the historical analyzer 210 may add a count regardless of whether the user takes the intersection from Magnolia, from Broadway, heading north or south on Broadway, etc. In another embodiment, the historical analyzer 210 may add a count for approaching the intersection from the same direction and not different directions (e.g. only for heading north on Broadway and turning onto Magnolia Lane).

In one embodiment, the historical analyzer 210 may maintain a record of the count and a timestamp for each time that the user traveled the portion of the route. For example, even if the user traveled a portion of the route many times, if it was years ago, the user may want to review the directions again. As a result, in some embodiments the historical analyzer 210 can determine the familiarity of a portion of the route as a function of the count and a recency of travelling the portion of the route. In one embodiment, the historical analyzer 210 can apply a weight to the count based on recency such that the weight decreases the influence of the count in the algorithm based on how long ago the user traveled on the portion of the route.

The historical analyzer 210 may remove portions of the route that are familiar to the user. In one embodiment, the historical analyzer 210 defines familiarity based on a threshold count of instances where the user traveled on the route or used the intersection previously. For example, the default threshold count is 30 and, as a result, if the user traveled on a road more than 30 times, the historical analyzer 210 may remove a direction for that portion of the route. In the embodiments where the route engine 204 has automatically created a route, most of the time the full route will be removed because the user is familiar with the route. However, instances where the user deviates from the route, for example because there was a detour or the user needed to find gas, the historical analyzer 210 keeps directions for getting back to the normal route.

In one embodiment, the route engine 204 may generate several instructions for each portion of the route. For example, the route engine 204 may generate an instruction to turn 2.0 miles from the turn, 1.0 miles from the turn and 0.4 miles from the turn. The historical analyzer 210 can remove all but one of the instructions for the portions of the route that are familiar. For example, the historical analyzer 210 can remove all but the instruction that the user will drive 1.0 miles before the user has to make a turn.

In one embodiment, the historical analyzer 210 can modify the route generated by the route engine 204 to include routes that are familiar to the user. For example, the historical analyzer 210 may use a threshold distance between the route generated by the route engine 204 and a route that the user has taken a set number of times and/or within a set time period. If the distance between the routes is below a threshold, the historical analyzer 210 may use the familiar route. This reflects the reality that users are often more interested in travelling a familiar route than an unfamiliar route even if it means travelling for five more minutes. In some embodiments, the user can specify the threshold distance setting via a user interface.

The feedback analyzer 212 can be software including routines for identifying user feedback in response to travelling the new route and modifying the settings in response to the feedback. In one embodiment, the feedback analyzer 212 can be a set of instructions executable by the processor 235 to provide the functionality described below for identifying user feedback and modifying the settings. In another embodiment, the feedback analyzer 212 can be stored in the memory 237 of the computing device 200 and can be accessible and executable by the processor 235. In either embodiment, the feedback analyzer 212 can be adapted for cooperation and communication with the processor 235 and other components of the computing device 200.

The feedback analyzer 212 may receive user feedback from the processing unit 202. In one embodiment, the feedback may include the performed route that the user took. The feedback analyzer 212 may compare the performed route to the new route generated by the historical analyzer 210. The feedback analyzer 212 can identify discrepancies between the routes. The feedback analyzer 212 may identify patterns in the discrepancies that indicate that the user was confused about the directions. For example, the feedback analyzer 212 may identify a portion of the route as problematic where the direction was to turn onto Street A and the user drove past Street A and then took Street B. As a result, the feedback analyzer 212 may determine that the user needs more instructions in similar circumstances. For example, if the historical analyzer 210 only provided one instruction to turn onto Street A because the user has made that turn 50 times in the past, the feedback analyzer 212 can modify the settings to provide two instructions to turn onto a street that the user has traveled 50 times (or a range, such as 40-60).

In another embodiment, the feedback analyzer 212 may receive audio feedback from the user. The feedback analyzer 212 may translate the speech to text and analyzes the results. For example, if the user said, "Okay, I get it already," the feedback analyzer 212 may determine that the historical analyzer 210 can remove at least one of a series of instructions about the same event. In another embodiment, the feedback analyzer 212 can recognize key terms that the user is provided to help train the feedback analyzer 212. For example, the feedback analyzer 212 may recognize that "too many" is feedback from the user expressing that there are too many instructions for the same event and remove, for example, the 2.0 mile indicator but leaves the 1.0 mile indicator and the 0.4 mile indicator. Conversely, the feedback analyzer 212 may recognize that "what?" is an instruction to provide additional directions now or with future instructions. It should be understood that other key terms are possible.

The user interface module 214 can be software including routines for generating a user interface for an administrator or the user. In one embodiment, the user interface module 214 can be a set of instructions executable by the processor 235 to provide the functionality described below for generating user interfaces. In another embodiment, the user interface module 214 can be stored in the memory 237 of the computing device 200 and can be accessible and executable by the processor 235. In either embodiment, the user interface module 214 can be adapted for cooperation and communication with the processor 235 and other components of the computing device 200.

In one embodiment, the user interface module 214 may generate a user interface for an administrator. For example, the user interface module 214 may receive instructions from the route engine 204 to generate graphical data for displaying statistics about user reaction to the new routes. For example, the user interface module 214 may generate statistics about how many users used the map, how many users complied with the instructions, how many times the users were confused by the directions, how many times the users provided feedback that they needed additional instructions, etc. Based on the statistics, the administrator can make global changes to the settings to help users. For example, if 40% of the users consistently asked for more directions, the administrator can use the user interface to change the settings for how familiar the user has to be with the route to receive a certain number of instructions.

In another embodiment, the user interface module 214 may receive instructions from the historical analyzer 210 to generate a map for the user. The user interface module 214 can update the map based on the user's current location, which may be provided to the user interface module 214 by the route engine 204. In some embodiments, the user interface module 214 may receive user input and modify the map based on the input. For example, the map may include options for zooming in, zooming out, moving the focus of the map, displaying information for nearby landmarks, etc. In some embodiments, the navigation application 109 may receive additional information from other servers about locations that can be included in the map. For example, the user interface module 214 can generate a map with icons for nearby restaurants and import reviews from a review website that are displayed when the user selects the icons.

In another embodiment, the user interface module 214 may generate a user interface for the user to change the settings. For example, the user can change the number of instructions, identify which types of streets should have more instructions, configure the interpretation of audio feedback, etc.

Example User Interfaces

Figure 3A:
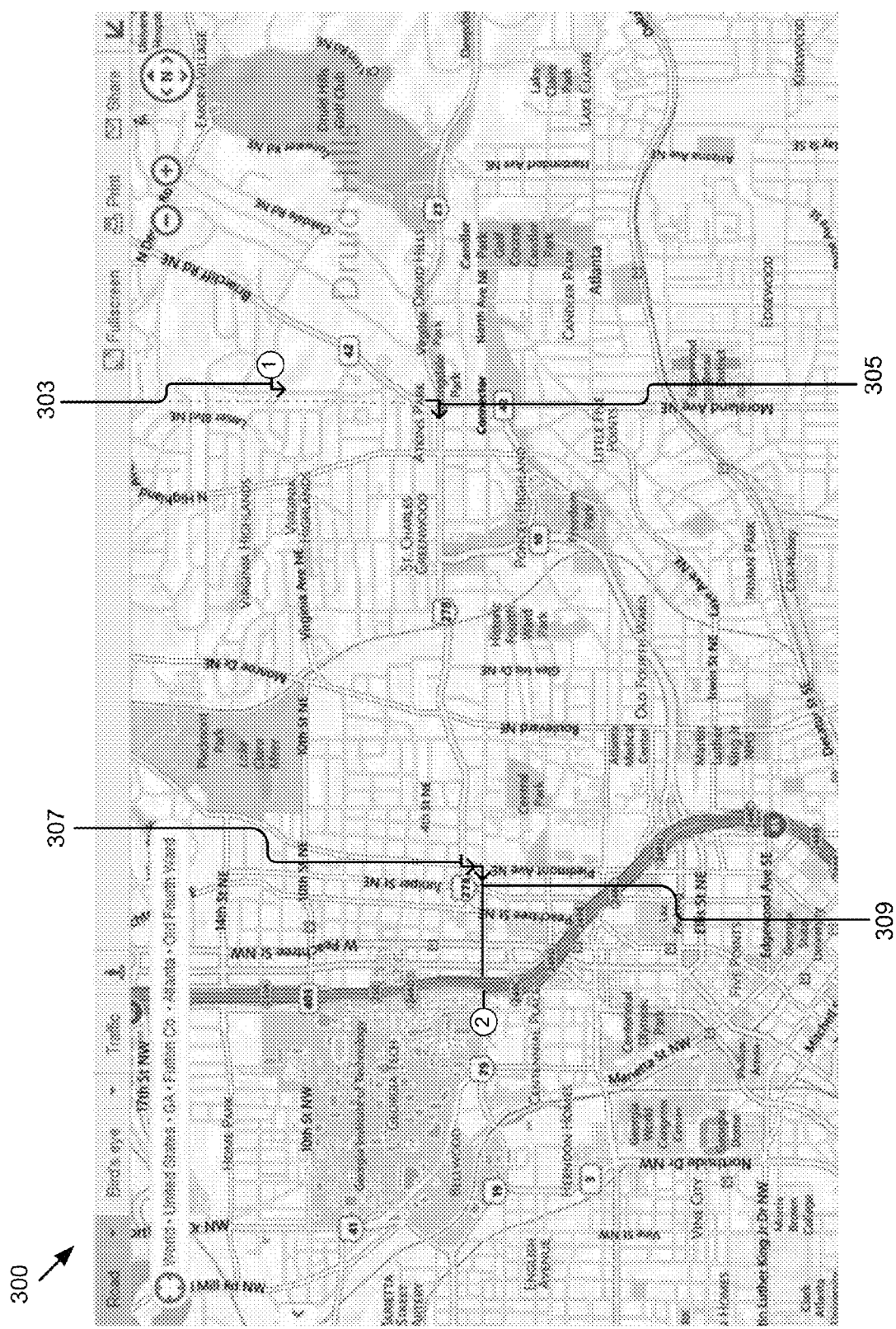
FIG. 3A is a graphic representation illustrating one embodiment of a map for providing personalized directions.

FIG. 3A is an example map 300 generated by the user interface module 214. In this example, the starting point is represented by the 1 and the ending point is represented by the 2. The arrows represent the locations in the map where the historical analyzer 210 provides instructions. In this example, the user is very familiar with the first part of the journey. The first direction 303 is to turn onto a road from the user's home. The second direction 305 is to turn onto a busy road. From here there are no additional instructions until the user gets off the road because the road is familiar. At that point the direction 307 is to turn off the road and the direction 309 is to turn onto an unfamiliar road to end at the destination.

FIG. 3B is an example user interface 325 for a user to change the settings for providing directions. In this example, the user can slide the button along a range to specify whether the directions should not emphasize intersections and to specify whether directions should be removed for familiar areas. This example also includes the ability to manipulate heuristics settings. The user can also specify whether freeways and city streets are important. For example, if freeways are not very important, there will be fewer directions while the user is on the freeway. This can be useful because some users find it annoying when the mapping software tells the user to stay on the same route at every intersection. As a result, by marking the freeways as being unimportant, the historical analyzer 210 instead provides directions for getting off the freeway.

FIG. 3C is an example user interface 350 for a user to provide feedback. In some embodiments, the user can confirm the meaning of audio feedback. For example, the historical analyzer 210 may generate a new route, the user interface module 214 may generate a map and the input/output devices 243 may detect audio feedback from the user. The feedback analyzer 212 may translate the audio into text and instructs the user interface module 214 to generate graphical data for displaying questions to confirm that the audio feedback was correctly interpreted. For example, the first question may be: "At the intersection of $1^{st}$ Rd. and A St. I think you said 'Where do I turn?' In the future do you want more directions for intersections?" The second question may be: "Ten minutes after driving on Rt. 95, after I said to stay on Rt. 95 you said 'I know.' In the future do you want fewer directions about staying on the same road?" The user can check boxes to confirm that the interpretation was correct, state that it was wrong or trigger contact from a representative. The contact with the representative can be helpful when the user is confused about how the software works. The representative can then act as an administrator and modify the settings.

Methods

Figure 4:
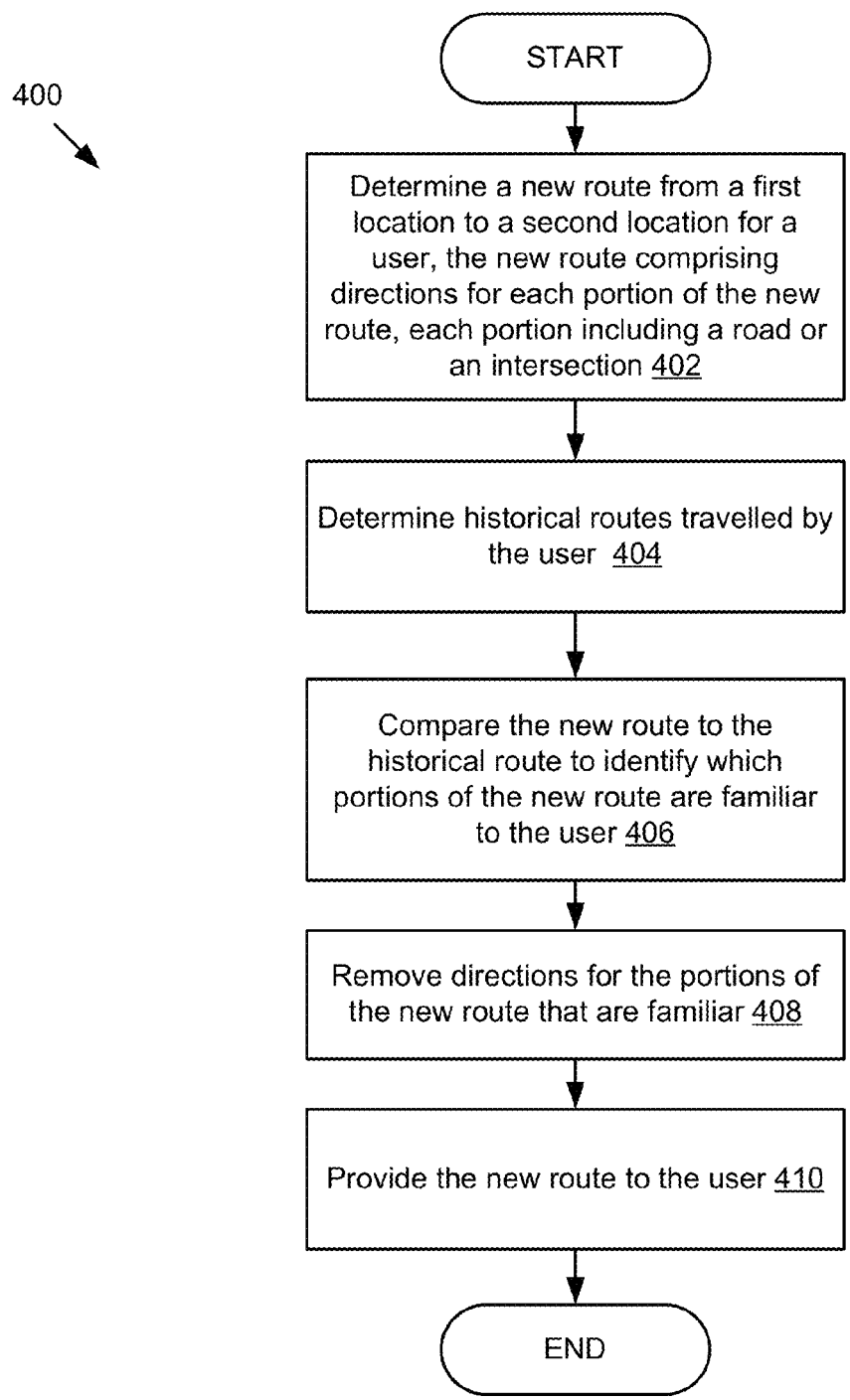
FIG. 4 is a flow diagram of one embodiment of a method for providing personalized directions.

FIG. 4 is a flow diagram of one embodiment of a method 400 for providing personalized directions. The navigation application 109 may include a route engine 204, a historical analyzer 210 and a user interface module 214. The route engine 204 determines 402 a new route from a first location to a second location for a user, the new route comprising directions for each portion of the new route, each portion including a road or an intersection. For example, the route engine 204 may generate the route or may transmit the request via the communication unit 241 to a mapping application 122. The route engine 204 may transmit the new route to the historical analyzer 210 or the historical analyzer 210 may retrieve the new route from storage 245.

The historical analyzer 210 determines 404 historical routes traveled by the user. For example, the historical analyzer may identify the roads and intersections traveled by the user and the number of times the user traveled on the roads and intersections. The historical analyzer 210 compares 406 the new route to the historical route to identify which portions of the new route are familiar to the user. The historical analyzer 210 removes 408 directions for the portions of the new route that are familiar. For example, where the new route overlaps with the user's work route, the historical analyzer 210 may remove the overlapping portions or remove some of the instructions involving the familiar route. The historical analyzer 210 instructs the user interface module 214 to generate graphical data for providing 410 the new route to the user. For example, the user interface module 214 can generate a map. In some embodiments, the historical analyzer 210 also may generate audio instructions that are transmitted to an input/output device 243, such has a speaker, to provide audio directions to the user.

Figure 5A:
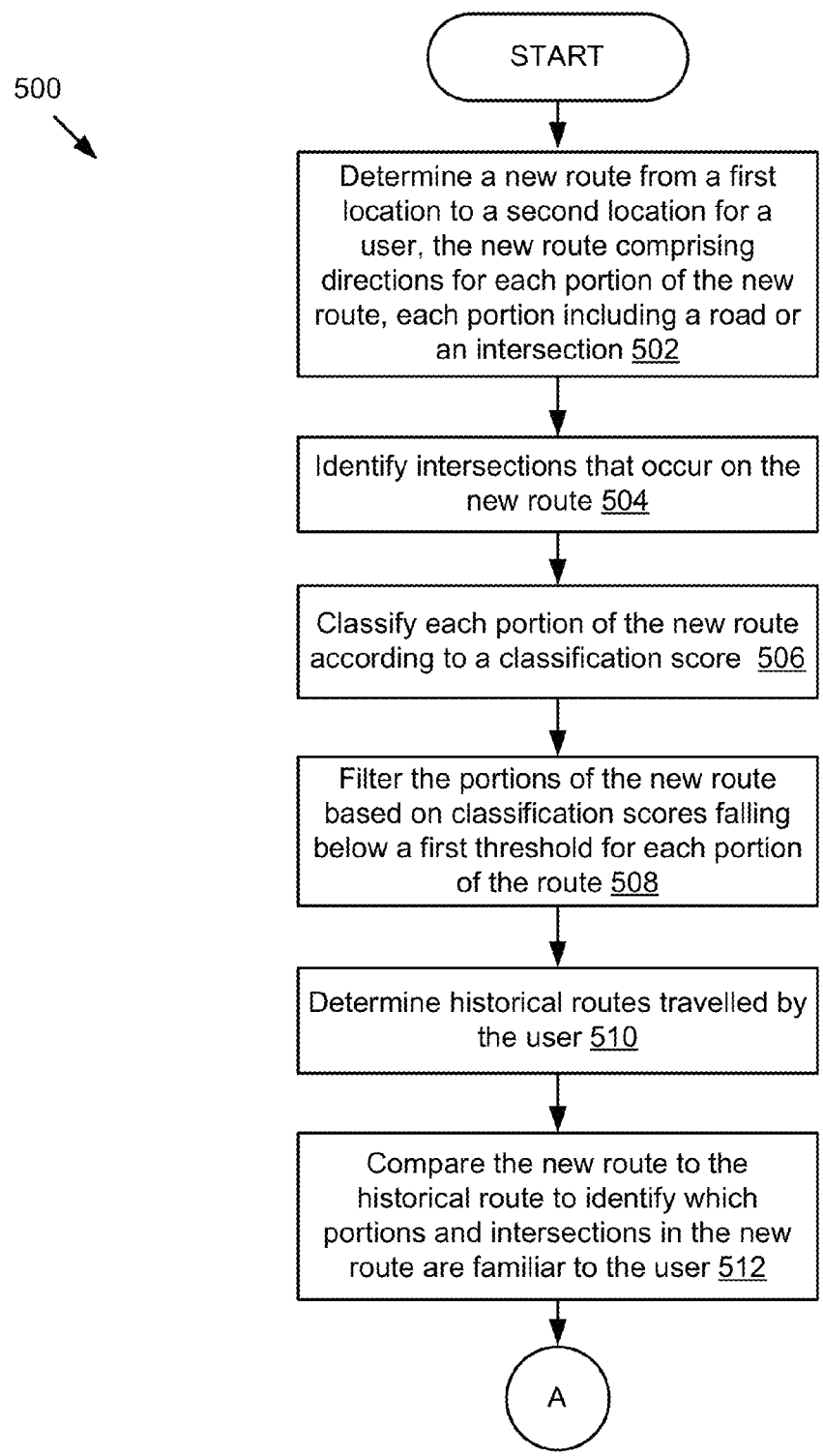
FIGS. 5A-5B are a flow diagram of another embodiment of a method for providing personalized directions.
Figure 5B:
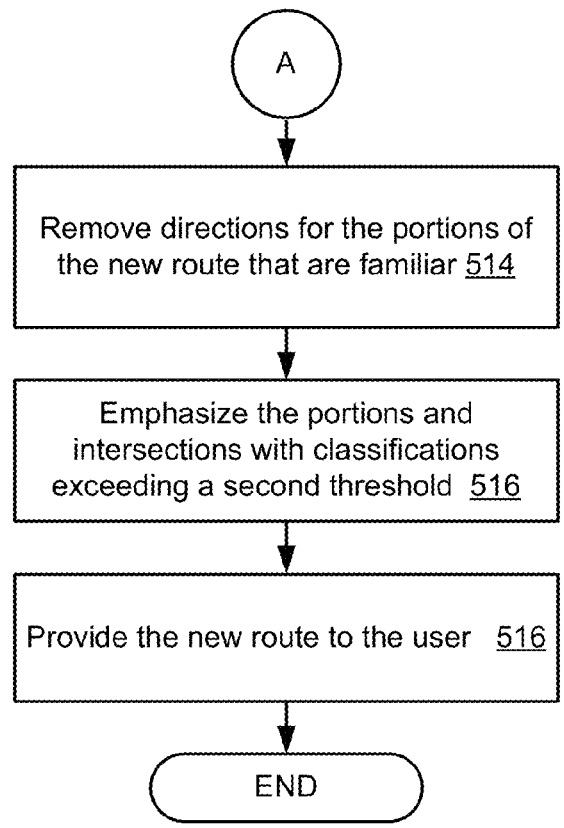

FIGS. 5A-5B are a flow diagram of another embodiment of a method for providing personalized directions. The navigation application 109 may include a route engine 204, an intersection extractor 206, a classifier 208, a historical analyzer 210 and a user interface module 214. The route engine 204 determines 502 a new route from a first location to a second location for a user, the new route comprising directions for each portion of the new route, each portion including a road or an intersection. The route engine 204 may transmit the new route to the intersection extractor 206 or the intersection extractor 206 may retrieve the new route from storage 245.

The intersection extractor 206 may identify 504 intersections that occur on the new route. The classifier 208 may receive the new route from the route engine 204 and the intersections from the intersection extractor 206 or the classifier 208 may retrieve the information from storage. The classifier 208 classifies 506 each portion of the new route according to a classification score. For example, the classifier 208 may apply a higher score to freeways than surface roads because freeways are classified as being more important than surface roads. The classifier 208 filters 508 the portions of the new route based on classification scores falling below a first threshold for each portion of the route. For example, the classifier 208 may filter portions of the route that fall below a threshold.

The historical analyzer 210 determines 510 historical routes traveled by the user. For example, the historical analyzer 210 may retrieve the historical routes from storage 245. The historical analyzer 210 compares 512 the new route to the historical route to identify which portions and intersections in the new route are familiar to the user. The historical analyzer 210 removes 514 directions for the portions of the new route that are familiar. The historical analyzer 210 emphasizes 516 the portions and intersections with classifications exceeding a second threshold. The historical analyzer 210 instructs the user interface module 214 to generate graphical data for providing 516 the new route to the user.

Figure 6:
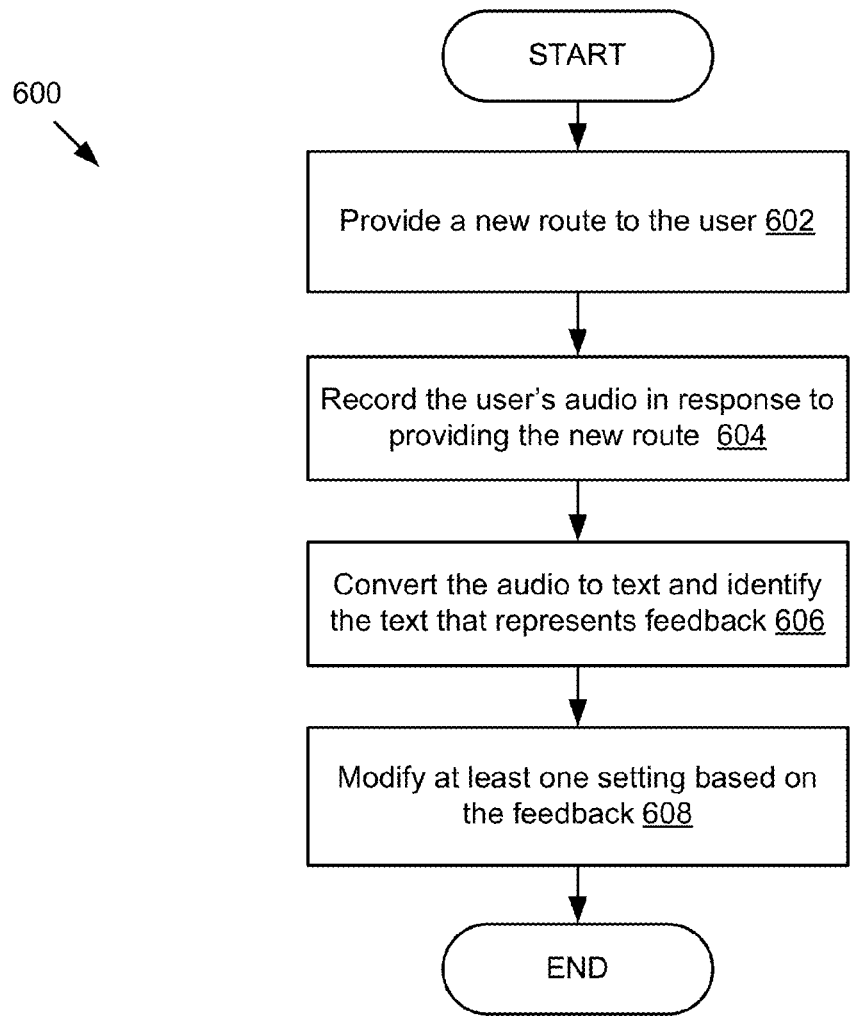
FIG. 6 is a flow diagram of one embodiment of a method for modifying settings based on feedback.

FIG. 6 is a flow diagram of one embodiment of a method for modifying settings based on feedback. The navigation application 109 may include a feedback analyzer 212 and a user interface module 214. The user interface module 214 provides 602 a new route to the user. For example, the user interface module 214 may generate a map. The feedback analyzer 212 records 604 the user's audio in response to providing the new route. The feedback analyzer 212 converts 606 the audio to text and identifies the text that represents feedback. For example, the feedback analyzer 212 may discard extraneous audio and recognize terms that are appropriate for the situation, such as preapproved words or words that are relevant in the context (e.g. what, say again, too much, etc.). The feedback analyzer 212 modifies 608 at least one setting based on the feedback. For example, if the user indicates that there are too many directions for a familiar portion of the new route, the feedback analyzer 212 can decrease the number of directions for similar situations.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining, with one or more processors, a new route from a first location to a second location for a user, the new route comprising directions for each portion of the new route, each portion including a road or an intersection;
   determining, with the one or more processors, historical routes traveled by the user;
   comparing, with the one or more processors, the new route to the historical route to identify which portions of the new route are familiar to the user;
   removing, with the one or more processors, directions for the portions of the new route that are familiar; and
   providing, with the one or more processors, the new route to the user.

2. The method of claim 1, further comprising:
   identifying intersections that occur on the new route, wherein comparing the new route to the historical route includes identifying which intersections in the new route are familiar to the user.

3. The method of claim 1, further comprising:
   classifying each portion of the new route according to a classification score; and
   filtering the portions of the new route falling below a first threshold for each portion of the route.

4. The method of claim 3, further comprising emphasizing the portions with classifications exceeding a second threshold.

5. The method of claim 1, further comprising:
   recording the user's audio in response to providing the new route;
   converting the audio to text and identifying the text that represents feedback; and
   modifying at least one setting based on the feedback.

6. The method of claim 1, wherein the historical route includes a count and a timestamp for when the user has traveled on each portion of the historical route, and removing directions for the portions of the new route that are familiar is based on the count and the timestamp.

7. The method of claim 1, further comprising generating a user interface for modifying settings for determining whether the portions of the new route are familiar.

8. A system comprising:
   one or more processors, the processors being configured to:
      determine a new route from a first location to a second location for a user, the new route comprising directions for each portion of the new route, each portion including a road or an intersection;
      determine historical routes traveled by the user;
      compare the new route to the historical route to identify which portions of the new route are familiar to the user;
      remove directions for the portions of the new route that are familiar; and
      provide the new route to the user.

9. The system of claim 8, wherein the system is further configured to:
   identify intersections that occur on the new route, wherein comparing the new route to the historical route includes identifying which intersections in the new route are familiar to the user.

10. The system of claim 8, wherein the system is further configured to:
    classify each portion of the new route according to a classification score; and
    filter the portions of the new route falling below a first threshold for each portion of the route.

11. The system of claim 10, wherein the system is further configured to emphasize the portions with classifications exceeding a second threshold.

12. The system of claim 8, wherein the system is further configured to:
    record the user's audio in response to providing the new route;
    convert the audio to text and identifying the text that represents feedback; and
    modify at least one setting based on the feedback.

13. The system of claim 8, wherein the historical route includes a count and a timestamp for when the user has traveled on each portion of the historical route, and removing directions for the portions of the new route that are familiar is based on the count and the timestamp.

14. The system of claim 8, wherein the system is further configured to generate a user interface for modifying settings for determining whether the portions of the new route are familiar.

15. A non-transitory computer readable storage medium including a computer readable program, wherein the computer readable program when executed on a computer causes the computer to:
    determine a new route from a first location to a second location for a user, the new route comprising directions for each portion of the new route, each portion including a road or an intersection;
    determine historical routes traveled by the user;
    compare the new route to the historical route to identify which portions of the new route are familiar to the user;
    remove directions for the portions of the new route that are familiar; and
    provide the new route to the user.

16. The non-transitory computer readable storage medium of claim 15, wherein the computer readable program is further configured to:

identify intersections that occur on the new route, wherein comparing the new route to the historical route includes identifying which intersections in the new route are familiar to the user.

17. The non-transitory computer readable storage medium of claim 15, wherein the computer readable program is further configured to:
classify each portion of the new route according to a classification score; and
filter the portions of the new route falling below a first threshold for each portion of the route.

18. The non-transitory computer readable storage medium of claim 17, wherein the computer readable program is further configured to emphasize the portions with classifications exceeding a second threshold.

19. The non-transitory computer readable storage medium of claim 15, wherein the computer readable program is further configured to:
record the user's audio in response to providing the new route;
convert the audio to text and identifying the text that represents feedback; and
modify at least one setting based on the feedback.

20. The non-transitory computer readable storage medium of claim 15, wherein the historical route includes a count and a timestamp for when the user has traveled on each portion of the historical route, and removing directions for the portions of the new route that are familiar is based on the count and the timestamp.

* * * * *